(12) United States Patent
Perdomo

(10) Patent No.: US 10,164,776 B1
(45) Date of Patent: Dec. 25, 2018

(54) SYSTEM AND METHOD FOR PRIVATE AND POINT-TO-POINT COMMUNICATION BETWEEN COMPUTING DEVICES

(71) Applicant: goTenna Inc., Brooklyn, NY (US)

(72) Inventor: Jorge Perdomo, New York, NY (US)

(73) Assignee: goTenna Inc., Brooklyn, NY (US)

( * ) Notice: Subject to any disclaimer, the term of this patent is extended or adjusted under 35 U.S.C. 154(b) by 0 days.

(21) Appl. No.: 15/997,625

(22) Filed: Jun. 4, 2018

Related U.S. Application Data

(63) Continuation of application No. 14/210,841, filed on Mar. 14, 2014, now Pat. No. 9,992,021.

(60) Provisional application No. 61/784,354, filed on Mar. 14, 2013.

(51) Int. Cl.
*H04L 9/00* (2006.01)
*H04L 9/14* (2006.01)

(52) U.S. Cl.
CPC .............. *H04L 9/14* (2013.01); *H04L 2209/24* (2013.01)

(58) Field of Classification Search
CPC ... H04L 9/14; H04L 2209/24; H04L 63/0492; H04L 63/18; H04W 12/00; H04W 12/08; H04W 67/20; H04W 40/12; H04W 4/02
USPC .............................................. 713/171; 726/3
See application file for complete search history.

(56) References Cited

U.S. PATENT DOCUMENTS

| | | |
|---|---|---|
| 4,549,275 A | 10/1985 | Sukonick |
| 4,646,075 A | 2/1987 | Andrews et al. |
| 4,694,404 A | 9/1987 | Meagher |
| 4,740,836 A | 4/1988 | Craig |
| 4,862,392 A | 8/1989 | Steiner |
| 4,879,652 A | 11/1989 | Nowak |
| 4,935,879 A | 6/1990 | Ueda |
| 4,953,107 A | 8/1990 | Hedley et al. |
| 4,958,147 A | 9/1990 | Kanema et al. |
| 4,992,780 A | 2/1991 | Penna et al. |
| 5,077,608 A | 12/1991 | Dubner |
| 5,247,587 A | 9/1993 | Hasegawa et al. |
| 5,342,047 A | 8/1994 | Heidel et al. |
| 5,343,395 A | 8/1994 | Watts |
| 5,416,848 A | 5/1995 | Young |
| 5,440,682 A | 8/1995 | Deering |
| 5,454,371 A | 10/1995 | Fenster et al. |
| 5,457,744 A | 10/1995 | Stone et al. |
| 5,493,595 A | 2/1996 | Schoolman |
| 5,495,576 A | 2/1996 | Ritchey |
| 5,510,832 A | 4/1996 | Garcia |
| 5,548,667 A | 8/1996 | Tu |
| 5,574,836 A | 11/1996 | Broemmelsiek |
| 5,673,081 A | 9/1997 | Yamashita et al. |
| 5,682,437 A | 10/1997 | Okino et al. |
| 5,682,895 A | 11/1997 | Ishiguro |
| 5,734,383 A | 3/1998 | Akimichi |
| 5,734,384 A | 3/1998 | Yanof et al. |

(Continued)

*Primary Examiner* — Samson B Lemma
(74) *Attorney, Agent, or Firm* — Tully Rinckey PLLC; Steven M. Hoffberg

(57) ABSTRACT

A hardware and software bundle that can enable computers and mobile phones to communicate small data packages without relying on the internet or the central cellular network infrastructure. The bundle enables users to send text messages and other data. For example, GPS coordinates, multimedia from the situation, accelerometer and other sensor data can all be sent over a decentralized network, enabling enhanced communication and situation response when the central grid is unavailable.

20 Claims, 3 Drawing Sheets

(56) References Cited

U.S. PATENT DOCUMENTS

| | | |
|---|---|---|
| 5,742,294 A | 4/1998 | Watanabe et al. |
| 5,748,199 A | 5/1998 | Palm |
| 5,777,666 A | 7/1998 | Tanase et al. |
| 5,781,146 A | 7/1998 | Frederick |
| 5,842,473 A | 12/1998 | Fenster et al. |
| 5,875,108 A | 2/1999 | Hoffberg et al. |
| 5,901,246 A | 5/1999 | Hoffberg et al. |
| 5,964,707 A | 10/1999 | Fenster et al. |
| 5,977,987 A | 11/1999 | Duluk, Jr. |
| 5,988,862 A | 11/1999 | Kacyra et al. |
| 5,990,900 A | 11/1999 | Seago |
| 6,016,150 A | 1/2000 | Lengyel et al. |
| 6,020,901 A | 2/2000 | Lavelle et al. |
| 6,023,263 A | 2/2000 | Wood |
| 6,046,745 A | 4/2000 | Moriya et al. |
| 6,059,718 A | 5/2000 | Taniguchi et al. |
| 6,064,393 A | 5/2000 | Lengyel et al. |
| 6,069,696 A | 5/2000 | McQueen et al. |
| 6,081,750 A | 6/2000 | Hoffberg et al. |
| 6,094,237 A | 7/2000 | Hashimoto |
| 6,118,887 A | 9/2000 | Cosatto et al. |
| 6,124,859 A | 9/2000 | Horii et al. |
| 6,151,026 A | 11/2000 | Iwade et al. |
| 6,154,121 A | 11/2000 | Cairns et al. |
| 6,166,748 A | 12/2000 | Van Hook et al. |
| 6,169,552 B1 | 1/2001 | Endo et al. |
| 6,206,691 B1 | 3/2001 | Lehmann et al. |
| 6,208,348 B1 | 3/2001 | Kaye |
| 6,212,132 B1 | 4/2001 | Yamane et al. |
| 6,229,553 B1 | 5/2001 | Duluk, Jr. et al. |
| 6,232,974 B1 | 5/2001 | Horvitz et al. |
| 6,239,810 B1 | 5/2001 | Van Hook et al. |
| 6,246,468 B1 | 6/2001 | Dimsdale |
| 6,268,875 B1 | 7/2001 | Duluk, Jr. et al. |
| 6,271,860 B1 | 8/2001 | Gross |
| 6,275,234 B1 | 8/2001 | Iwaki |
| 6,285,378 B1 | 9/2001 | Duluk, Jr. |
| 6,301,370 B1 | 10/2001 | Steffens et al. |
| 6,326,964 B1 | 12/2001 | Snyder et al. |
| 6,330,523 B1 | 12/2001 | Kacyra et al. |
| 6,331,856 B1 | 12/2001 | Van Hook et al. |
| 6,334,847 B1 | 1/2002 | Fenster et al. |
| 6,342,892 B1 | 1/2002 | Van Hook et al. |
| 6,362,822 B1 | 3/2002 | Randel |
| 6,375,782 B1 | 4/2002 | Kumar et al. |
| 6,400,996 B1 | 6/2002 | Hoffberg et al. |
| 6,405,132 B1 | 6/2002 | Breed et al. |
| 6,418,424 B1 | 7/2002 | Hoffberg et al. |
| 6,420,698 B1 | 7/2002 | Dimsdale |
| 6,429,903 B1 | 8/2002 | Young |
| 6,445,833 B1 | 9/2002 | Murata et al. |
| 6,461,298 B1 | 10/2002 | Fenster et al. |
| 6,473,079 B1 | 10/2002 | Kacyra et al. |
| 6,476,803 B1 | 11/2002 | Zhang et al. |
| 6,489,955 B1 | 12/2002 | Newhall, Jr. |
| 6,496,183 B1 | 12/2002 | Bar-Nahum |
| 6,512,518 B2 | 1/2003 | Dimsdale |
| 6,512,993 B2 | 1/2003 | Kacyra et al. |
| 6,515,659 B1 | 2/2003 | Kaye et al. |
| 6,518,965 B2 | 2/2003 | Dye et al. |
| 6,522,336 B1 | 2/2003 | Yuasa |
| 6,525,722 B1 | 2/2003 | Deering |
| 6,526,352 B1 | 2/2003 | Breed et al. |
| 6,549,203 B2 | 4/2003 | Randel |
| 6,556,197 B1 | 4/2003 | Van Hook et al. |
| 6,580,430 B1 | 6/2003 | Hollis et al. |
| 6,587,112 B1 | 7/2003 | Goeltzenleuchter et al. |
| 6,593,926 B1 | 7/2003 | Yamaguchi et al. |
| 6,593,929 B2 | 7/2003 | Van Hook et al. |
| 6,597,363 B1 | 7/2003 | Duluk, Jr. et al. |
| 6,603,476 B1 | 8/2003 | Paolini et al. |
| 6,614,444 B1 | 9/2003 | Duluk, Jr. et al. |
| 6,618,048 B1 | 9/2003 | Leather |
| 6,636,214 B1 | 10/2003 | Leather et al. |
| 6,654,018 B1 | 11/2003 | Cosatto et al. |
| 6,664,958 B1 | 12/2003 | Leather et al. |
| 6,664,962 B1 | 12/2003 | Komsthoeft et al. |
| 6,704,018 B1 | 3/2004 | Mori et al. |
| 6,707,458 B1 | 3/2004 | Leather et al. |
| 6,716,175 B2 | 4/2004 | Geiser et al. |
| 6,747,642 B1 | 6/2004 | Yasumoto |
| 6,754,373 B1 | 6/2004 | de Cuetos et al. |
| 6,756,986 B1 | 6/2004 | Kuo et al. |
| 6,798,390 B1 | 9/2004 | Sudo et al. |
| 6,840,107 B2 | 1/2005 | Gan |
| 6,904,163 B1 | 6/2005 | Fujimura et al. |
| 6,937,245 B1 | 8/2005 | Van Hook et al. |
| 6,956,578 B2 | 10/2005 | Kuo et al. |
| 6,980,218 B1 | 12/2005 | Demers et al. |
| 6,988,991 B2 | 1/2006 | Kim et al. |
| 6,999,069 B1 | 2/2006 | Watanabe et al. |
| 6,999,100 B1 | 2/2006 | Leather et al. |
| 7,006,085 B1 | 2/2006 | Acosta et al. |
| 7,015,931 B1 | 3/2006 | Cieplinski |
| 7,046,841 B1 | 5/2006 | Dow et al. |
| 7,061,488 B2 | 6/2006 | Randel |
| 7,061,502 B1 | 6/2006 | Law et al. |
| 7,075,545 B2 | 7/2006 | Van Hook et al. |
| 7,088,362 B2 | 8/2006 | Mori et al. |
| 7,098,809 B2 | 8/2006 | Feyereisen et al. |
| 7,098,908 B2 | 8/2006 | Acosta et al. |
| 7,116,323 B2 | 10/2006 | Kaye et al. |
| 7,116,324 B2 | 10/2006 | Kaye et al. |
| 7,116,335 B2 | 10/2006 | Pearce et al. |
| 7,130,490 B2 | 10/2006 | Elder et al. |
| 7,133,041 B2 | 11/2006 | Kaufman et al. |
| 7,156,655 B2 | 1/2007 | Sachdeva et al. |
| 7,184,059 B1 | 2/2007 | Fouladi et al. |
| 7,228,279 B2 | 6/2007 | Chaudhari et al. |
| 7,242,460 B2 | 7/2007 | Hsu et al. |
| 7,248,258 B2 | 7/2007 | Acosta et al. |
| 7,251,603 B2 | 7/2007 | Connell et al. |
| 7,256,791 B2 | 8/2007 | Sullivan et al. |
| 7,286,119 B2 | 10/2007 | Yamaguchi et al. |
| 7,307,640 B2 | 12/2007 | Demers et al. |
| 7,319,955 B2 | 1/2008 | Deligne et al. |
| 7,330,198 B2 | 2/2008 | Yamaguchi et al. |
| 7,391,418 B2 | 6/2008 | Pulli et al. |
| 7,403,641 B2 | 7/2008 | Nakamoto et al. |
| 7,446,775 B2 | 11/2008 | Hara et al. |
| 7,471,291 B2 | 12/2008 | Kaufman et al. |
| 7,477,360 B2 | 1/2009 | England et al. |
| 7,480,617 B2 | 1/2009 | Chu et al. |
| 7,502,026 B2 | 3/2009 | Acosta et al. |
| 7,532,220 B2 | 5/2009 | Barenbrug et al. |
| 7,538,772 B1 | 5/2009 | Fouladi et al. |
| 7,573,475 B2 | 8/2009 | Sullivan et al. |
| 7,573,489 B2 | 8/2009 | Davidson et al. |
| 7,576,748 B2 | 8/2009 | Van Hook et al. |
| 7,613,663 B1 | 11/2009 | Commons et al. |
| 7,647,087 B2 | 1/2010 | Miga et al. |
| 7,671,857 B2 | 3/2010 | Pulli et al. |
| 7,677,295 B2 | 3/2010 | Fulton et al. |
| 7,684,623 B2 | 3/2010 | Shen et al. |
| 7,684,934 B2 | 3/2010 | Shvartsburg et al. |
| 7,685,042 B1 | 3/2010 | Monroe et al. |
| 7,689,019 B2 | 3/2010 | Boese et al. |
| 7,689,588 B2 | 3/2010 | Badr et al. |
| 7,692,650 B2 | 4/2010 | Ying et al. |
| 7,693,318 B1 | 4/2010 | Stalling et al. |
| 7,693,333 B2 | 4/2010 | Ryu et al. |
| 7,697,748 B2 | 4/2010 | Dimsdale et al. |
| 7,697,765 B2 | 4/2010 | Matsugu et al. |
| 7,699,782 B2 | 4/2010 | Angelsen et al. |
| 7,702,064 B2 | 4/2010 | Boese et al. |
| 7,702,155 B2 | 4/2010 | Glickman et al. |
| 7,702,599 B2 | 4/2010 | Widrow |
| 7,702,660 B2 | 4/2010 | Chan et al. |
| 7,707,128 B2 | 4/2010 | Matsugu |
| 7,710,115 B2 | 5/2010 | Hargreaves |
| 7,712,961 B2 | 5/2010 | Horndler et al. |
| 7,715,609 B2 | 5/2010 | Rinck et al. |
| 7,719,552 B2 | 5/2010 | Karman |
| 7,777,761 B2 | 8/2010 | England et al. |

(56) References Cited

U.S. PATENT DOCUMENTS

| | | |
|---|---|---|
| 7,831,087 B2 | 11/2010 | Harville |
| 7,868,892 B2 | 1/2011 | Hara et al. |
| 7,884,823 B2 | 2/2011 | Bertolami et al. |
| 7,940,279 B2 | 5/2011 | Pack |
| 7,974,461 B2 | 7/2011 | England et al. |
| 7,990,397 B2 | 8/2011 | Bukowski et al. |
| 7,995,069 B2 | 8/2011 | Van Hook et al. |
| 8,089,506 B2 | 1/2012 | Takayama et al. |
| 8,139,554 B1* | 3/2012 | Simon .................. H04W 40/12 370/349 |
| 8,177,551 B2 | 5/2012 | Sachdeva et al. |
| 8,179,393 B2 | 5/2012 | Minear et al. |
| 8,294,949 B2 | 10/2012 | Shitara et al. |
| 8,305,426 B2 | 11/2012 | Matsubara |
| 8,370,873 B2 | 2/2013 | Shintani |
| 8,401,276 B1 | 3/2013 | Choe et al. |
| 8,514,267 B2 | 8/2013 | Underwood et al. |
| 8,538,136 B2 | 9/2013 | Wilkinson et al. |
| 8,553,561 B1* | 10/2013 | Chokshi ................ H04L 45/125 370/238 |
| 8,594,180 B2 | 11/2013 | Yang et al. |
| 8,659,592 B2 | 2/2014 | Wang et al. |
| 8,666,081 B2 | 3/2014 | Oh et al. |
| 8,787,655 B2 | 7/2014 | Tatsumi |
| 8,797,620 B2 | 8/2014 | Yankov et al. |
| 8,842,165 B2 | 9/2014 | Wada |
| 8,848,558 B1* | 9/2014 | Martin .................... H04L 41/12 370/252 |
| 8,861,836 B2 | 10/2014 | Wei et al. |
| 8,878,897 B2 | 11/2014 | Huang et al. |
| 8,907,968 B2 | 12/2014 | Tanaka et al. |
| 8,913,107 B2 | 12/2014 | Huang |
| 8,941,782 B2 | 1/2015 | Kim et al. |
| 8,947,605 B2 | 2/2015 | Eichenlaub |
| 8,963,928 B2 | 2/2015 | Koike |
| 9,014,507 B2 | 4/2015 | Mack et al. |
| 9,053,562 B1 | 6/2015 | Rabin et al. |
| 9,055,277 B2 | 6/2015 | Katayama et al. |
| 9,104,096 B2 | 8/2015 | Koike |
| 9,177,413 B2 | 11/2015 | Tatarinov et al. |
| 9,386,291 B2 | 7/2016 | Tomioka et al. |
| 9,386,294 B2 | 7/2016 | Luthra et al. |
| 9,402,072 B2 | 7/2016 | Onishi et al. |
| 9,407,896 B2 | 8/2016 | Lam et al. |
| 9,438,892 B2 | 9/2016 | Onishi et al. |
| 9,462,257 B2 | 10/2016 | Zurek et al. |
| 9,495,791 B2 | 11/2016 | Maleki et al. |
| 9,665,800 B1 | 5/2017 | Kuffner, Jr. |
| 2001/0052899 A1 | 12/2001 | Simpson et al. |
| 2002/0059042 A1 | 5/2002 | Kacyra et al. |
| 2002/0067355 A1 | 6/2002 | Randel |
| 2002/0080143 A1 | 6/2002 | Morgan et al. |
| 2002/0085000 A1 | 7/2002 | Sullivan et al. |
| 2002/0145607 A1 | 10/2002 | Dimsdale |
| 2002/0149585 A1 | 10/2002 | Kacyra et al. |
| 2002/0158865 A1 | 10/2002 | Dye et al. |
| 2002/0158870 A1 | 10/2002 | Brunkhart et al. |
| 2002/0158872 A1 | 10/2002 | Randel |
| 2002/0176619 A1 | 11/2002 | Love |
| 2002/0186217 A1 | 12/2002 | Kamata et al. |
| 2003/0001835 A1 | 1/2003 | Dimsdale et al. |
| 2003/0080963 A1 | 5/2003 | Van Hook et al. |
| 2003/0197737 A1 | 10/2003 | Kim |
| 2004/0006273 A1 | 1/2004 | Kim et al. |
| 2004/0041813 A1 | 3/2004 | Kim |
| 2004/0104915 A1 | 6/2004 | Mori et al. |
| 2004/0109608 A1 | 6/2004 | Love et al. |
| 2004/0114800 A1 | 6/2004 | Ponomarev et al. |
| 2004/0125103 A1 | 7/2004 | Kaufman et al. |
| 2004/0157662 A1 | 8/2004 | Tsuchiya |
| 2004/0164956 A1 | 8/2004 | Yamaguchi et al. |
| 2004/0164957 A1 | 8/2004 | Yamaguchi et al. |
| 2004/0165776 A1 | 8/2004 | Brouwer |
| 2004/0197727 A1 | 10/2004 | Sachdeva et al. |
| 2005/0007374 A1 | 1/2005 | Kuo et al. |
| 2005/0024378 A1 | 2/2005 | Pearce et al. |
| 2005/0030311 A1 | 2/2005 | Hara et al. |
| 2005/0053276 A1 | 3/2005 | Curti et al. |
| 2005/0099414 A1 | 5/2005 | Kaye et al. |
| 2005/0138359 A1* | 6/2005 | Simon .................. H04L 63/0823 713/156 |
| 2005/0146521 A1 | 7/2005 | Kaye et al. |
| 2005/0162436 A1 | 7/2005 | Van Hook et al. |
| 2005/0168461 A1 | 8/2005 | Acosta et al. |
| 2005/0171456 A1 | 8/2005 | Hirschman et al. |
| 2005/0174972 A1* | 8/2005 | Boynton ................ H04L 47/10 370/337 |
| 2005/0185711 A1 | 8/2005 | Pfister et al. |
| 2005/0195200 A1 | 9/2005 | Chuang et al. |
| 2005/0195210 A1 | 9/2005 | Demers et al. |
| 2005/0243323 A1 | 11/2005 | Hsu et al. |
| 2006/0007301 A1 | 1/2006 | Cho et al. |
| 2006/0061566 A1 | 3/2006 | Verma et al. |
| 2006/0061651 A1 | 3/2006 | Tetterington |
| 2006/0146049 A1 | 7/2006 | Pulli et al. |
| 2006/0184966 A1 | 8/2006 | Hunleth et al. |
| 2006/0197768 A1 | 9/2006 | Van Hook et al. |
| 2006/0232598 A1 | 10/2006 | Barenbrug et al. |
| 2006/0238613 A1 | 10/2006 | Takayama et al. |
| 2006/0239333 A1* | 10/2006 | Albert ............... H04W 72/0406 375/130 |
| 2006/0244746 A1 | 11/2006 | England et al. |
| 2006/0244749 A1 | 11/2006 | Kondo et al. |
| 2006/0268716 A1* | 11/2006 | Wijting .................. H04L 47/10 370/235 |
| 2006/0279569 A1 | 12/2006 | Acosta et al. |
| 2007/0070083 A1 | 3/2007 | Fouladi et al. |
| 2007/0081718 A1 | 4/2007 | Rubbert et al. |
| 2007/0099147 A1 | 5/2007 | Sachdeva et al. |
| 2007/0195087 A1 | 8/2007 | Acosta et al. |
| 2007/0206008 A1 | 9/2007 | Kaufman et al. |
| 2007/0223701 A1* | 9/2007 | Emeott ................. H04L 63/065 380/270 |
| 2007/0248066 A1* | 10/2007 | Banerjea ................ H04L 45/26 370/338 |
| 2007/0279412 A1 | 12/2007 | Davidson et al. |
| 2007/0279415 A1 | 12/2007 | Sullivan et al. |
| 2007/0280528 A1 | 12/2007 | Wellington et al. |
| 2008/0024490 A1 | 1/2008 | Loop et al. |
| 2008/0101109 A1 | 5/2008 | Haring-Bolivar et al. |
| 2008/0150945 A1 | 6/2008 | Wang et al. |
| 2008/0170067 A1 | 7/2008 | Kim et al. |
| 2008/0198920 A1 | 8/2008 | Yang et al. |
| 2008/0225046 A1 | 9/2008 | Pulli et al. |
| 2008/0225047 A1 | 9/2008 | Pulli et al. |
| 2008/0226123 A1 | 9/2008 | Birtwistle et al. |
| 2008/0228449 A1 | 9/2008 | Birtwistle et al. |
| 2008/0246622 A1 | 10/2008 | Chen |
| 2008/0256130 A1 | 10/2008 | Kirby et al. |
| 2008/0270335 A1 | 10/2008 | Matsugu |
| 2008/0270338 A1 | 10/2008 | Adams |
| 2008/0273173 A1 | 11/2008 | Grotehusmann et al. |
| 2008/0281591 A1 | 11/2008 | Droppo et al. |
| 2008/0304707 A1 | 12/2008 | Oi et al. |
| 2008/0317350 A1 | 12/2008 | Yamaguchi et al. |
| 2008/0319568 A1 | 12/2008 | Berndlmaier et al. |
| 2009/0006101 A1 | 1/2009 | Rigazio et al. |
| 2009/0010529 A1 | 1/2009 | Zhou et al. |
| 2009/0015590 A1 | 1/2009 | Hara et al. |
| 2009/0027402 A1 | 1/2009 | Bakalash et al. |
| 2009/0034366 A1 | 2/2009 | Mathiszik et al. |
| 2009/0035869 A1 | 2/2009 | Scuor |
| 2009/0049890 A1 | 2/2009 | Zhong et al. |
| 2009/0076347 A1 | 3/2009 | Anderson et al. |
| 2009/0080757 A1 | 3/2009 | Roger et al. |
| 2009/0080778 A1 | 3/2009 | Lee et al. |
| 2009/0080803 A1 | 3/2009 | Hara et al. |
| 2009/0087040 A1 | 4/2009 | Torii et al. |
| 2009/0087084 A1 | 4/2009 | Neigovzen et al. |
| 2009/0097722 A1 | 4/2009 | Dekel et al. |
| 2009/0122979 A1 | 5/2009 | Lee et al. |
| 2009/0128551 A1 | 5/2009 | Bakalash et al. |
| 2009/0141024 A1 | 6/2009 | Lee et al. |
| 2009/0144173 A1 | 6/2009 | Mo et al. |

(56) References Cited

U.S. PATENT DOCUMENTS

| | | |
|---|---|---|
| 2009/0144213 A1 | 6/2009 | Patil et al. |
| 2009/0146657 A1 | 6/2009 | Hebrank et al. |
| 2009/0148070 A1 | 6/2009 | Hwang et al. |
| 2009/0149156 A1 | 6/2009 | Yeo |
| 2009/0152356 A1 | 6/2009 | Reddy et al. |
| 2009/0153553 A1 | 6/2009 | Kim et al. |
| 2009/0154794 A1 | 6/2009 | Kim et al. |
| 2009/0161944 A1 | 6/2009 | Lau et al. |
| 2009/0161989 A1 | 6/2009 | Sim |
| 2009/0164339 A1 | 6/2009 | Rothman |
| 2009/0167595 A1 | 7/2009 | Cross et al. |
| 2009/0169076 A1 | 7/2009 | Lobregt et al. |
| 2009/0169118 A1 | 7/2009 | Eichhorn et al. |
| 2009/0179896 A1 | 7/2009 | Rottger |
| 2009/0181769 A1 | 7/2009 | Thomas et al. |
| 2009/0184349 A1 | 7/2009 | Dungan |
| 2009/0185750 A1 | 7/2009 | Schneider |
| 2009/0189889 A1 | 7/2009 | Engel et al. |
| 2009/0195640 A1 | 8/2009 | Kim et al. |
| 2009/0196492 A1 | 8/2009 | Jung et al. |
| 2009/0208112 A1 | 8/2009 | Hamamura et al. |
| 2009/0213113 A1 | 8/2009 | Sim et al. |
| 2009/0220155 A1 | 9/2009 | Yamamoto et al. |
| 2009/0225073 A1 | 9/2009 | Baker |
| 2009/0226183 A1 | 9/2009 | Kang |
| 2009/0231327 A1 | 9/2009 | Minear et al. |
| 2009/0232355 A1 | 9/2009 | Minear et al. |
| 2009/0232388 A1 | 9/2009 | Minear et al. |
| 2009/0232399 A1 | 9/2009 | Kawahara et al. |
| 2009/0237327 A1 | 9/2009 | Park et al. |
| 2009/0254496 A1 | 10/2009 | Kanevsky et al. |
| 2009/0262108 A1 | 10/2009 | Davidson et al. |
| 2009/0262184 A1 | 10/2009 | Engle et al. |
| 2009/0268964 A1 | 10/2009 | Takahashi |
| 2009/0272015 A1 | 11/2009 | Schnuckle |
| 2009/0273601 A1 | 11/2009 | Kim |
| 2009/0279756 A1 | 11/2009 | Gindele et al. |
| 2009/0287624 A1 | 11/2009 | Rouat et al. |
| 2009/0290788 A1 | 11/2009 | Bogan et al. |
| 2009/0290800 A1 | 11/2009 | Lo |
| 2009/0290811 A1 | 11/2009 | Imai |
| 2009/0295801 A1 | 12/2009 | Fritz et al. |
| 2009/0295805 A1 | 12/2009 | Ha et al. |
| 2009/0297000 A1 | 12/2009 | Shahaf et al. |
| 2009/0297010 A1 | 12/2009 | Fritz et al. |
| 2009/0297011 A1 | 12/2009 | Brunner et al. |
| 2009/0297021 A1 | 12/2009 | Islam et al. |
| 2009/0310216 A1 | 12/2009 | Roh et al. |
| 2009/0315979 A1 | 12/2009 | Jung et al. |
| 2009/0322742 A1 | 12/2009 | Muktinutalapati et al. |
| 2009/0322860 A1 | 12/2009 | Zhang et al. |
| 2009/0324107 A1 | 12/2009 | Walch |
| 2009/0326841 A1 | 12/2009 | Zhang et al. |
| 2010/0007659 A1 | 1/2010 | Ludwig et al. |
| 2010/0014781 A1 | 1/2010 | Liu et al. |
| 2010/0016750 A1 | 1/2010 | Anderson et al. |
| 2010/0020159 A1 | 1/2010 | Underwood et al. |
| 2010/0026642 A1 | 2/2010 | Kim et al. |
| 2010/0026789 A1 | 2/2010 | Balogh |
| 2010/0026909 A1 | 2/2010 | Yoon |
| 2010/0027606 A1 | 2/2010 | Dai et al. |
| 2010/0027611 A1 | 2/2010 | Dai et al. |
| 2010/0034450 A1 | 2/2010 | Mertelmeier |
| 2010/0034469 A1 | 2/2010 | Thorpe et al. |
| 2010/0039573 A1 | 2/2010 | Park et al. |
| 2010/0045461 A1 | 2/2010 | Caler et al. |
| 2010/0045696 A1 | 2/2010 | Bruder et al. |
| 2010/0046796 A1 | 2/2010 | Pietquin |
| 2010/0047811 A1 | 2/2010 | Winfried et al. |
| 2010/0060857 A1 | 3/2010 | Richards et al. |
| 2010/0061598 A1 | 3/2010 | Seo |
| 2010/0061603 A1 | 3/2010 | Mielekamp et al. |
| 2010/0063992 A1 | 3/2010 | Ma et al. |
| 2010/0066701 A1 | 3/2010 | Ningrat |
| 2010/0073366 A1 | 3/2010 | Tateno |
| 2010/0073394 A1 | 3/2010 | Van Hook et al. |
| 2010/0082299 A1 | 4/2010 | Dhanekula et al. |
| 2010/0085358 A1 | 4/2010 | Wegbreit et al. |
| 2010/0086099 A1 | 4/2010 | Kuzmanovic |
| 2010/0086220 A1 | 4/2010 | Minear |
| 2010/0091354 A1 | 4/2010 | Nam et al. |
| 2010/0092075 A1 | 4/2010 | Lee et al. |
| 2010/0097374 A1 | 4/2010 | Fan et al. |
| 2010/0099198 A1 | 4/2010 | Zhao et al. |
| 2010/0110070 A1 | 5/2010 | Kim et al. |
| 2010/0110162 A1 | 5/2010 | Yun et al. |
| 2010/0115272 A1* | 5/2010 | Batta .............. H04L 45/00 713/162 |
| 2010/0115347 A1 | 5/2010 | Noyes |
| 2010/0118053 A1 | 5/2010 | Karp et al. |
| 2010/0118125 A1 | 5/2010 | Park |
| 2010/0121798 A1 | 5/2010 | Matsugu et al. |
| 2010/0123716 A1 | 5/2010 | Li et al. |
| 2010/0124368 A1 | 5/2010 | Ye et al. |
| 2010/0137021 A1* | 6/2010 | Sharret .............. H04W 88/04 455/550.1 |
| 2010/0157425 A1 | 6/2010 | Oh |
| 2010/0207936 A1 | 8/2010 | Minear et al. |
| 2010/0208981 A1 | 8/2010 | Minear et al. |
| 2010/0209013 A1 | 8/2010 | Minear et al. |
| 2010/0220893 A1 | 9/2010 | Lee et al. |
| 2010/0315415 A1 | 12/2010 | Asami |
| 2011/0018867 A1 | 1/2011 | Shibamiya et al. |
| 2011/0043540 A1 | 2/2011 | Fancher et al. |
| 2011/0063410 A1 | 3/2011 | Robert |
| 2011/0069152 A1 | 3/2011 | Wang et al. |
| 2011/0109722 A1 | 5/2011 | Oh et al. |
| 2011/0115812 A1 | 5/2011 | Minear et al. |
| 2011/0188780 A1 | 8/2011 | Wang et al. |
| 2011/0200249 A1 | 8/2011 | Minear et al. |
| 2011/0225611 A1 | 9/2011 | Shintani |
| 2011/0255746 A1 | 10/2011 | Berkovich et al. |
| 2011/0311128 A1 | 12/2011 | Wilkinson et al. |
| 2012/0033873 A1 | 2/2012 | Ozeki et al. |
| 2012/0086782 A1 | 4/2012 | Wada |
| 2012/0120190 A1 | 5/2012 | Lee |
| 2012/0120191 A1 | 5/2012 | Lee |
| 2012/0121164 A1 | 5/2012 | Tatsumi |
| 2012/0127159 A1 | 5/2012 | Jeon et al. |
| 2012/0134287 A1* | 5/2012 | Turunen ............. H04W 4/06 370/252 |
| 2012/0146997 A1 | 6/2012 | Ishimaru et al. |
| 2012/0147135 A1 | 6/2012 | Matsubara |
| 2012/0147154 A1 | 6/2012 | Matsubara |
| 2012/0154529 A1 | 6/2012 | Kobayashi |
| 2012/0162363 A1 | 6/2012 | Huang et al. |
| 2012/0162396 A1 | 6/2012 | Huang |
| 2012/0169843 A1 | 7/2012 | Luthra et al. |
| 2012/0179413 A1 | 7/2012 | Hasse et al. |
| 2012/0182387 A1 | 7/2012 | Enenkl et al. |
| 2012/0183202 A1 | 7/2012 | Wei et al. |
| 2012/0200680 A1 | 8/2012 | So et al. |
| 2012/0223944 A1 | 9/2012 | Koike |
| 2012/0229462 A1 | 9/2012 | Eichenlaub |
| 2012/0249754 A1 | 10/2012 | Akashi |
| 2012/0287233 A1 | 11/2012 | Wang et al. |
| 2012/0314038 A1 | 12/2012 | Murayama et al. |
| 2012/0320050 A1 | 12/2012 | Koike |
| 2013/0010061 A1 | 1/2013 | Matsubara |
| 2013/0044108 A1 | 2/2013 | Tanaka et al. |
| 2013/0050451 A1 | 2/2013 | Shintani |
| 2013/0083164 A1 | 4/2013 | Engelbert et al. |
| 2013/0100132 A1 | 4/2013 | Katayama et al. |
| 2013/0135447 A1 | 5/2013 | Kim |
| 2013/0155206 A1 | 6/2013 | Lazarski et al. |
| 2013/0155477 A1 | 6/2013 | Yankov et al. |
| 2013/0173235 A1 | 7/2013 | Freezer |
| 2013/0176393 A1 | 7/2013 | Onishi et al. |
| 2013/0182798 A1* | 7/2013 | Lozano ............. H04L 65/4084 375/340 |
| 2013/0194397 A1 | 8/2013 | Kim et al. |
| 2013/0194502 A1 | 8/2013 | Kim et al. |
| 2013/0215241 A1 | 8/2013 | Onishi et al. |
| 2013/0229488 A1 | 9/2013 | Ishimaru et al. |

(56) References Cited

U.S. PATENT DOCUMENTS

| | | |
|---|---|---|
| 2013/0235154 A1 | 9/2013 | Salton-Morgenstern et al. |
| 2013/0302013 A1 | 11/2013 | Takeshita |
| 2013/0308800 A1 | 11/2013 | Bacon |
| 2013/0312082 A1* | 11/2013 | Izu .................. H04L 9/0891 726/13 |
| 2013/0321577 A1 | 12/2013 | Kobayashi |
| 2013/0342513 A1 | 12/2013 | Kim et al. |
| 2014/0062999 A1 | 3/2014 | Syu et al. |
| 2014/0064567 A1 | 3/2014 | Kim et al. |
| 2014/0114630 A1 | 4/2014 | Brave |
| 2014/0184738 A1 | 7/2014 | Tomioka et al. |
| 2014/0192147 A1 | 7/2014 | Mack et al. |
| 2014/0218358 A1 | 8/2014 | Mack et al. |
| 2014/0267280 A1 | 9/2014 | Zurek et al. |
| 2014/0347362 A1 | 11/2014 | Maleki et al. |
| 2015/0002508 A1 | 1/2015 | Tatarinov et al. |
| 2015/0016748 A1 | 1/2015 | Ko et al. |
| 2015/0103081 A1 | 4/2015 | Bae et al. |
| 2015/0181195 A1 | 6/2015 | Bruls et al. |
| 2015/0269737 A1 | 9/2015 | Lam et al. |
| 2015/0289015 A1 | 10/2015 | Jung |
| 2015/0324840 A1 | 11/2015 | Ramnath Krishnan |
| 2015/0356789 A1 | 12/2015 | Komatsu et al. |
| 2016/0109940 A1 | 4/2016 | Lyren et al. |
| 2016/0150223 A1 | 5/2016 | Hwang et al. |
| 2016/0180193 A1 | 6/2016 | Masters et al. |
| 2016/0180441 A1 | 6/2016 | Hasan et al. |
| 2016/0241828 A1 | 8/2016 | Richards et al. |
| 2016/0286196 A1 | 9/2016 | Luthra et al. |

\* cited by examiner

SYSTEM AND METHOD FOR PRIVATE AND POINT-TO-POINT COMMUNICATION BETWEEN COMPUTING DEVICES

CROSS REFERENCE TO RELATED APPLICATION

The present application is a Continuation of U.S. patent application Ser. No. 14/210,841, filed Mar. 14, 2014, now U.S. Pat. No. 9,992,021, issued Jun. 5, 2018, which is a nonprovisional and claims benefit of priority from U.S. Provisional Patent Application No. 61/784,354, filed Mar. 14, 2013, the entirety of which are expressly incorporated herein by reference.

FIELD OF THE INVENTION

The present disclosure is directed to point-to-point communication between computing devices. More particular, the present disclosure is directed to enabling computing devices such as computers and mobile phones to communicate data packages without necessary reliance on the internet or central cellular infrastructure.

BACKGROUND

People are dependent on our computers and mobile phones today, however the computers and mobile phones are reliant on central infrastructure in the form of the internet and cell towers, respectively to operate. If any kind of scenario arises where that central infrastructure is unavailable or suffering degraded performance, the computers and mobile phones are not able to communicate with other computers and mobile phones.

SUMMARY

A hardware and software bundle that can enable computers and mobile phones to communicate small data packages without relying on the internet or the central cellular network infrastructure. This may be referred to as user-to-user communications (U2U) or point-to-point (P2P). Computers and mobile phones enable users to send much more than text messages. For example, GPS coordinates, multimedia from the situation, accelerometer and other sensor data can all be sent over a decentralized network, enabling enhanced communication and situation response when the central grid is unavailable.

It is an object of the invention to provide a communication method, comprising: conducting a public/private key exchange to define an encryption key; encrypting a message with the encryption key and associating the encrypted message with a target identifier and an expiration time; communicating the encrypted message through a mesh network which includes at least one member which stores and forwards the encrypted message; receiving the encrypted message by a recipient based on the target identifier; and deleting the received message after passage of the expiration time.

BRIEF DESCRIPTION OF THE DRAWINGS

The present disclosure will be more readily understood from the detailed description of exemplary embodiments presented below considered in conjunction with the attached drawings, of which.

It is to be understood that the attached drawings are for purposes of illustrating the concepts of the invention.

DETAILED DESCRIPTION

Software and hardware package can be added to users' existing computers and mobile phones and enable them to transmit small data packages (text, GPS coordinates, sensor data, asynchronous voice, multimedia, or any other digital data hereafter referred to as "messages") directly to each other or through a direct connection or mesh network without reliance on external infrastructure.

Figure 1:
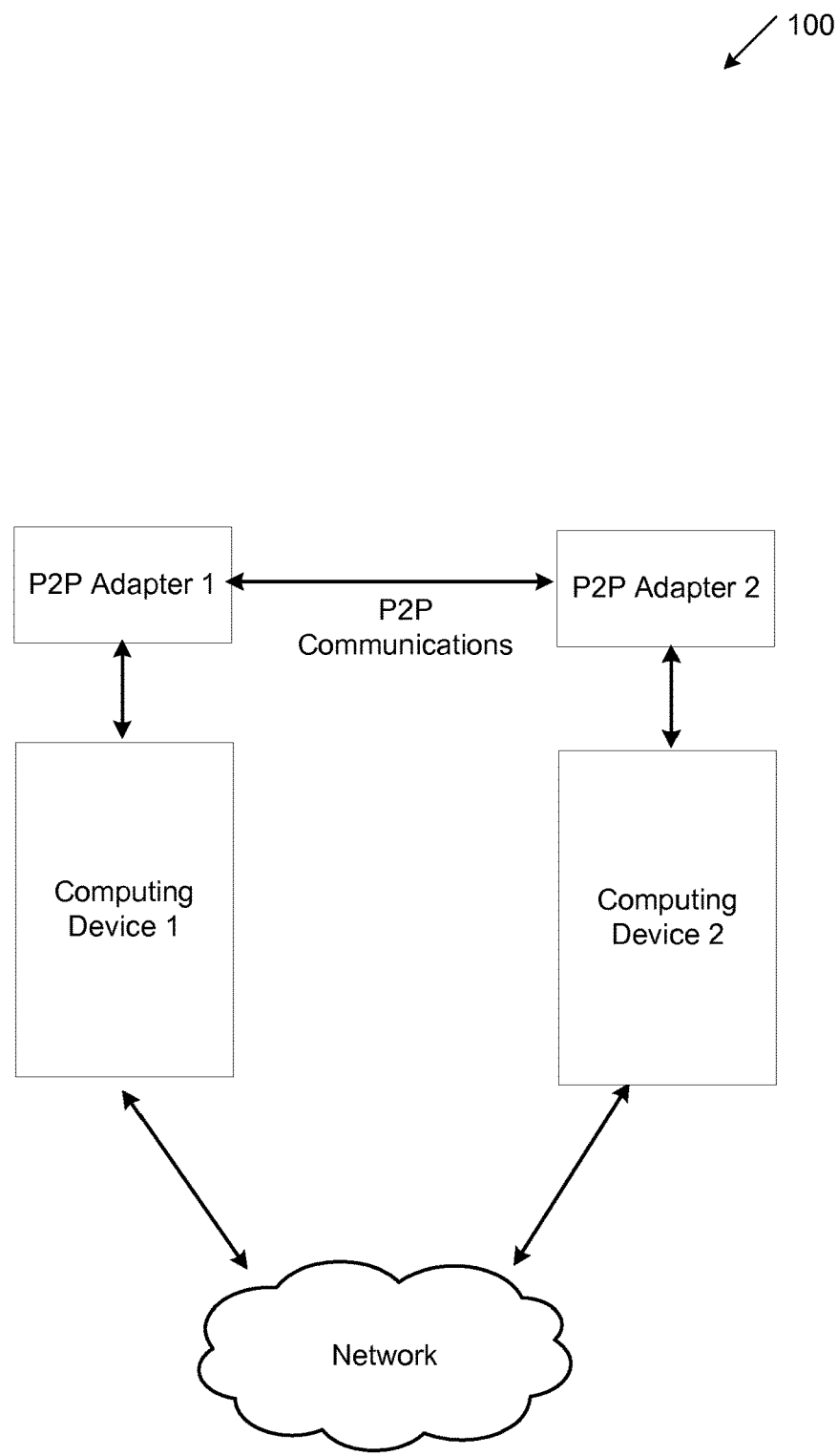
FIG. 1 is an example block diagram of systems for enabling private and point-to-point communication between computing devices in accordance with embodiments of the present invention.

FIG. 1 is an example block diagram of systems for enabling computers and mobile phones to communicate data packages in accordance with embodiments of the present invention. FIG. 1 includes a network, computing devices 1 and 2, and P2P adapters 1 and 2. The network may be a network such as the internet a cellular telephone network, a metropolitan area network (MAN), a Wide area network (WAN), a wireless local area network, a virtual local area network, a common local area network (LAN), personal area network (PAN), campus area network (CAN), or the like. Computing devices 1 and 2 may be a communication endpoint such as a consumer workstation, a server, a computer, a portable electronic device, an entertainment system configured to communicate over a network, such as a set-top box, a digital receiver, a digital television, a mobile phone, or other electronic devices. For example, portable electronic devices may include, but are not limited to, cellular phones, portable gaming systems, portable computing devices, or the like.

The P2P adapters 1 and 2 may include software and hardware packages for enabling private and point-to-point (P2P) communication between computing devices. As used herein, the P2P adapters 1 and 2 may also be referred to as the "device." Also, as used herein, P2P communications refers to a communications connection between two endpoints or computing devices.

As shown in FIG. 1, the computing devices 1 and 2 may communicate with each other via the public network. The P2P adapters 1 and 2 may enable the computing devices 1 and 2 to communicate with each other via P2P or via a private network.

Functional Characteristics for establishing P2P communication between computing devices can include, for example, the following:

1. Send data from one computer or mobile phone to another computer or mobile phone without using the internet or the central cellular infrastructure
2. Establish a system where messages can be sent to specific targeted users
3. Establish manual "channels" where groups of people can chat
4. Operate on unlicensed FCC spectrum 5. Be compatible with leading computers and mobile phones 6. Utilize commodity radio chipsets to create an external digital radio device which can be paired with computers or mobile phones 7. Use existing computer or mobile phone display and input mechanisms 8. Using existing computer or mobile phone processors to power software app 9. Use public/private key encryption to ensure privacy In an example, a device for radio communication can be paired with a computer or mobile phone to leverage the ease of use and power of users' existing computer or mobile phones.

The device can handle sending and receipt of small messages via radio, and can interface with the computer or mobile phone to display and input new messages.

The device can remain active even when not directly communicating with the computer or mobile phone, and can continue to receive and send messages, attempt retries if the recipient is not in range, and forward messages to other participants in the mesh network.

Outline of Device Function:

Sender Software Operations

User composes a new message for transmission to a recipient in their contact list.

Software operations can compress the message into as small a data packet as possible.

Software operations can create the message, comprised of the unencrypted recipient ID and checksum, and encrypted payload (sender ID, timestamp, and message). Devices that receive the message can verify the completeness and accuracy of the transmission, but not read the contents, as the message payload can be encrypted so that only the intended recipient can decrypt it.

Software operations can transmit the message to the device for sending. Transmission to the device may be handled through headphone-jack audio coupling, Bluetooth, NFC, USB, custom short-range radio, shared network WiFi communication, or other means.

Sender Hardware

A device can receive the message from the computer or mobile phone, and attempt to broadcast it to other nearby devices over unlicensed radio spectrum, and confirm receipt of that message, automatically retrying as appropriate until the recipient is in range and is able to successful return a receipt signal.

Receiver Hardware

The device can listen for new messages via radio, and store incoming messages as appropriate.

Receiving hardware firmware can first check if the target ID matches the ID of the computer or phone it is paired with or another computer or phone in its approved network. If there is no match, the message can be discarded. If matched, the software can continue to next steps.

Hardware can check the checksum to confirm successful receipt of full data package. If not successful, it can continue to gather data packets as the message is retried until the full message is received.

If/when successful checksum is achieved, software can send a small receipt signal with the message ID# in the same way or in a similar way as original messages are sent.

When next paired with the computer or mobile phone, the device can deliver stored messages to the computer or phone for decryption and display.

Receiver Software Operations

When the device's software is opened on the user's computer or mobile phone, it can pair with the device and receive stored messages. It can then decrypt the messages and display them to the user.

The receiver can then choose to respond and this process can repeat in the same manner.

List of Product Implementation Variables

An outline a variety of different ways which could implement different functional pieces of the final device as well as some advanced features planned in our development roadmap.

General Form Factor: Description of device implementation.

External dongle: Any kind of device which exists not as an integrated part of a phone or computer, but which still relies on a phone or computer to operate.

Built into phone: Any kind of hardware integrated into a consumer phone or computer which enables User-to-User (U2U) communications in addition to regular computer or cell phone operations Standalone device: A completely independent device that enables U2U communications without reliance on a phone or computer.

Integrated eyeglass display: U2U communications capabilities built into, or working with, an integrated eyeglass display such as Google® Glass.

Functional Pieces

Antenna: This part of the hardware package for the device can be responsible for both the receipt and broadcasting of signals. Working together with the radio chipset, the antenna can be the entry/exit port of signals into spectrum. The antenna may come in a variety of shapes and sizes depending on final form factor as well as the section of spectrum a particular device model might be designed to operate on.

External antenna: An antenna that is not integrated into the computer or phone. It can be a free-standing external hardware piece which can be attached to the computer or phone if the user desires, or it can also operate completely independent of it.

Integrated internal antenna (phone): Antenna that is built directly into a computer or phone. The antenna would live inside the phone not unlike phones' regular 3G, 4G, and other such antennas.

Integrated internal antenna (freestanding device): Not unlike the phone-integrated antenna, however this would be in the case of a full freestanding device being made independent of a computer or mobile phone entirely.

Repurposing existing phone antennas: By accessing the firmware/software on a computer or mobile phone's existing antennas (any of them) and modifying the settings to allow the antennas to broadcast on new frequencies or on the same frequencies but operating in an U2U manner. The existing cellular antenna/radios firmware/software can be modified to allow them to communicate with each other directly over their normal frequencies. This could require updating their programming controls so that the phones did not attempt to connect to a tower, but instead connected to another phone with similar customizations active.

Radio Chipset: This part of the device hardware package can work in tandem with the antenna to prepare signals for broadcast, as well as processing their receipt. The radio chipset's responsibilities include:

Processing between digital and analog signals (to/from)

Setting frequency hopping patterns/protocols

Error-correction

1. External radio chipset: Independent radio chipset not integrated into a computer or phone or wholly freestanding device, however designed to work in conjunction with a computer or mobile phone to enable U2U communications.

2. Integrated radio chipset: A chipset designed for U2U communications integrated into a computer or mobile phone as an additional chipset.

3. Repurposing existing radio chipsets: Inside a computer or mobile phone accessing the firmware/software to enable any of a computer or phone's existing radio chips to enable U2U communications.

4. Allow the device-enabled chipsets/antennas to broadcast on the same frequencies and protocols (GSM/CDMA/etc) as major cell carriers to become a defacto "Roaming" network which other users could connect to with their regular cell antennas without any device hardware or other customization. This essentially emulates a cell tower which a user can choose to "Roam" onto and then send messages via that connection to that single connection or as part of a larger mesh network.

Broadcasting Protocols

Spectrum: This is the spectrum where the device hardware can be operating. The device can operate on public band spectrum that does not require the user to have a radio operator's license. The spectrum broadcast on can be changed with either a physical add-on/modification to the base device hardware package, or multiple models of the device can be created for varied applications (government, military, wall-penetrating, marine long range, city consumer, etc.—at times different spectrum can be optimal for each consumer type). The protocols and functionality can be similar or identical across all electromagnetic spectrums.

Data interface: Primary processing, data input/display, and security features can be via computer or mobile phone's existing processors and data input/output features (e.g., touch screens, processors, etc.). The data to be sent via our radio hardware, or the data received via that same hardware can make it to and from the computer or mobile phone's primary hardware and any device hardware. Methods by which this can be achieved include:

Via the headphone jack: Most mobile phones have Tip-Ring-Ring-Sleeve (TRRS) headphone jacks. These jacks allow for both the output and input of audio signals. The output is the regular contact one uses for audio, but there is also a contact for a microphone which allows data to come back in to the phone. The device can use the data input/output contacts already found with TRRS headphone jacks to transfer data to and from the device hardware. This can require software that can send the appropriate signals to the mobile phone's audio output chip, as well as receive signals back. Once the signals are out, the device hardware can be able to interpret those signals for broadcast (and receipt).

The connection pathway via the headphone jack can be:

Direct wire (line connection) from headphone jack to device hardware.

Proprietary low power radio reading signals from headphone jack and broadcasting it a short range to the device hardware.

Near field communications chip via headphone jack.
Bluetooth® low energy add on via headphone jack.
Bluetooth® add on via headphone jack.
WiFi add on via headphone jack.

Universal Serial Bus (USB) ports: A computer can directly talk to the device hardware via USB. Computers and mobile phones can also communicate via their own micro-USB connector. The connection pathway can be made for any of the variations found for the headphone jack as well originating via the USB ports (direct line, NFC, etc.)

Near field communications (NFC): Mobile phones or computers with their own built in NFC chips can be paired with the device and data can be sent and received via that medium.

Apple® iOS ports: Same as USB ports, but using any of the iOS proprietary ports (30-pin, Lightening).

WiFi: Using phone or computer's WiFi to connect with device hardware.

Bluetooth®/Low-Power Bluetooth®: Using a phone/computer's existing Bluetooth chips to communicate with device hardware.

Integrated: For integrated solutions in a phone or standalone device the necessary connections can be on the circuit boards themselves.

Processing: There can be two batches of processing. Some pre-processing can occur on the radio chipset (this has already been covered). However primary processing to decode signals and display/create them for a user requires more advanced processing power. This section refers to that processing.

Mobile phone or computer's built in processing power: Building apps on leading platforms which pair with the device hardware.

Device processors: For a standalone device all processing would have to be handled by device processors that can include these higher level functionalities into it (same goes for user interface).

Mix of both: Certain functions can be split between the device processors and phone/computer processors depending on best use. For example, error-correction could be handled by firmware processing, while decoding of encryption can be done by higher power phone/computer processors.

Error Correction (to extend range we'll deal with imperfect/incomplete signals)

Checksums: Checksums can be sent as an unencrypted part of the total data signal. Firmware can collect the checksums and run the necessary calculations to determine if the message was completed correctly before storing or sending it to the computer or phone for decryption, or rebroadcasting it as part of a mesh network.

Resends: Sender can attempt automatic resends for an appropriate period of time or until a receipt signal for that unique message is received back.

Partial packet reconstruction: If receiver only successfully captures X of Y data packets, it can temporarily save them to see if it can capture some of the missing packets and reconstruct the entire data set.

Privacy: Privacy is one of the primary value propositions of the device. As used herein, privacy means that only intended recipients will be capable of decrypting and accessing the contents of any data package sent via the device.

Public/private key exchange (derivation of PGP): This is an example of a core of the device's privacy system. Each user can be able to create a highly randomized security key based on sensor data from the computer or mobile phone (accelerometer, random screen movement input, etc.). Based on this unique key, device's software can create a public/private key pair that can be shared with users they want to speak with privately.

Firmware control: Firmware can discard any messages with a target ID not matching that computer or phone's ID or not matching any group IDs that user may be a part of.

Proprietary Encryption: device may develop proprietary encryption with software controls only allowing the decoding and display of messages with target ID value matching computer or phone's ID (e.g., phone number)

Message decay: Software controls can be implemented that can cause a message to be deleted after X period of time set by sender.

Password access: App may require password/fingerprint/etc. to open at all.

Networking: Method of extending the device unit range beyond strict U2U communications.

Mesh networking (store-and-forward): Messages sent by one device user can automatically be rebroadcast by other device users in range for X period of time or until confirmation receipt is sent back by recipient. This takes U2U communication to U2U2U and so forth.

Private mesh networks (e.g., VPN): Users can build private mesh networks where only other members of their group are stored-and-forwarded or are done so with preference over others.

Device rebroadcast points: The device or its customers set up higher power fixed rebroadcast points in strategic points to extend the range of all device units as a high-power general store-and-forward point.

Mobile rebroadcast points: Same function as the fixed rebroadcast points but in a mobile unit.

Power: Methods of powering the device.

Battery: Primary power source.

Emergency secondary battery: Independently toggled power source (not automatic) which can allow a very limited amount of power for broadcast and listening.

Capacitor: A small capacitor can be integrated for small emergency bursts of broadcast or listening. Powering options include:

Solar

Earphone jack

Kinetic (crank)

USB: Device battery can charge off of USB power, and be able to run on it as well.

Proprietary mobile phone ports: Power can be drawn from any proprietary port like the iOS Lightening port.

Wireless induction: Device can be powered through wireless induction from a nearby base station that can be plugged into AC/DC power, computer, solar, or any other original source Fuel cells Power drawn from mobile phone's headphone audio jack.

Basic User Features

One to one chat for discrete users

Group chat

Management of messages sent/received by contacts list in computer or phone

Other Features

GPS coordinates: GPS coordinates could be drawn from phone or computer's GPS receiver and transmitted. The receiving computer or phone could use the coordinates to display sender's location on Google® Maps or in a device proximal display (display showing location relative to own GPS coordinates).

Triangulation: the device unit can be requested to go into active ping mode to allow other units searching for its particular signal to triangulate its position based off of other device unit rebroadcasting. Results could be shown in a proximal display (display relative to own position—i.e., 50 feet away, North)

Rough pinging: Like triangulation, but for when triangulation is not possible. User being located could still have to enter ping mode, and distance could be based only off of rough measurement of signal strength. Display could only be rough distance without direction.

Emergency mode: All units may have the ability to broadcast with overpower on emergency frequencies as dictated by the FCC Standby E-ink display: Units may include a screen displaying number of messages being held locally by the device hardware while not actively exchanging data with a phone/computer (low power use)

Speech to text interface: Either accomplished via computer or phone software or any other device software such as Google® Glass. Microphone could capture speech, and software package would translate it to text for transmittal.

4D base station triangulation: In locations that require it (emergency mostly), 4 device rebroadcast points could be set up around a building (3 outside on same level, $4^{th}$ elevated above others) to penetrate building walls and display a 4D map of any device units inside and their movements.

Potential Application: track the location of fire fighters inside a building and relay both the positions of other firefighters as well as which areas have already been checked to them back over device devices.

Commercial application: find things in stores or track consumers.

Open API for developers: Self-explanatory. 3rd party developers can use the API to develop new uses of the device hardware.

Entry/exit points to the world wide web by either device fixed access points, or by relaying a message to a user which can have an enabled "Internet Entry" option which can allow any device message it receives, which requests for access, to use their data connection (of any type) to enter the wider internet and either process to a device online app, or any other end point (partner apps, re-exit back to the device system, etc.).

There can also be "Internet Exit" points which can be either fixed devices, or a user who enables the device to be an exit point. Here the jump is in reverse and a message which entered or originated from the internet hops out onto the device's ad-hoc network to proceed along its path as required.

Figure 2:
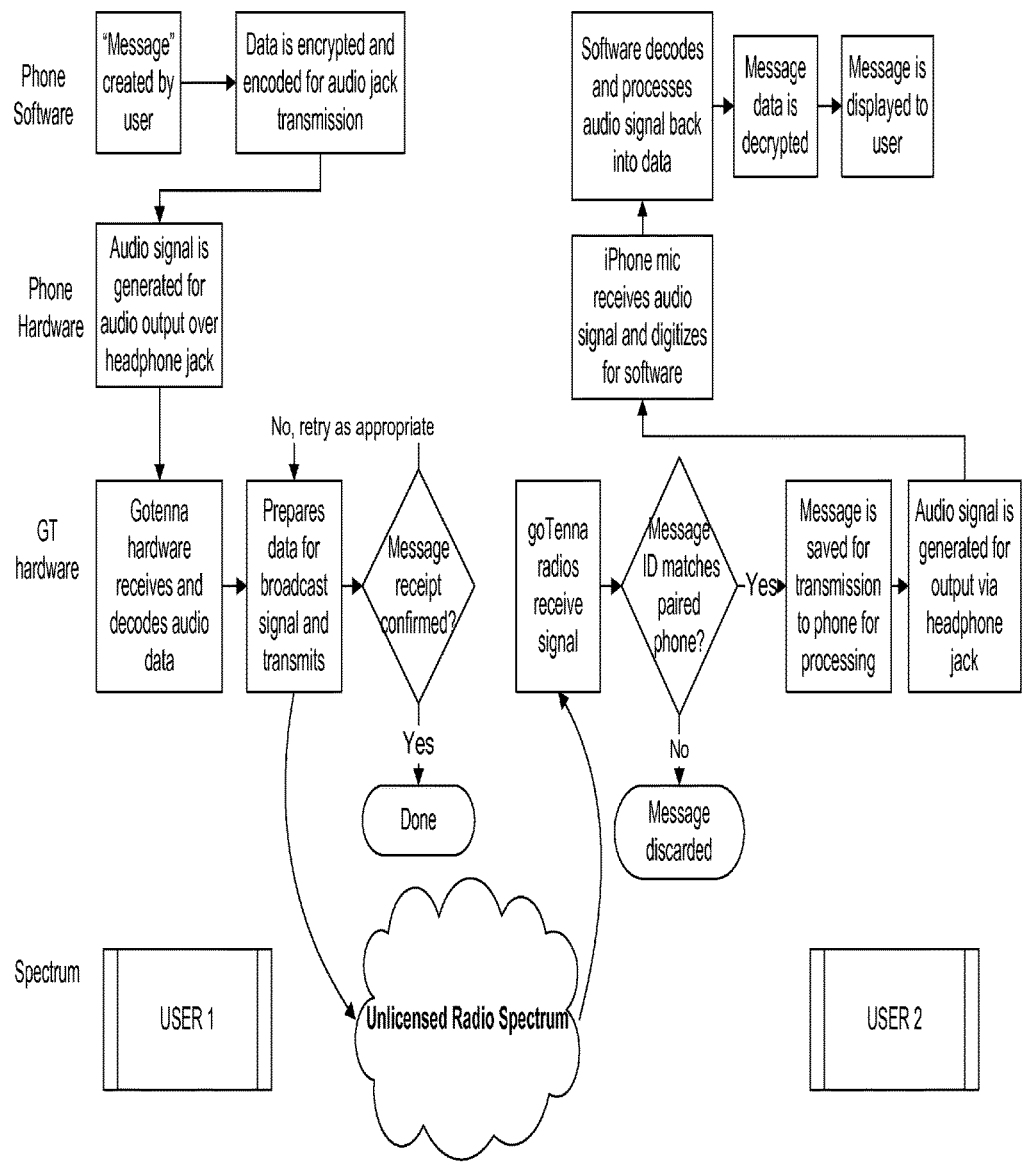
FIG. 2 is a flow diagram of an example method for enabling private and point-to-point communication between computing devices in accordance with embodiments of the present invention.

FIG. 2 is a flow diagram of an example method for enabling private and point-to-point communication between computing devices in accordance with embodiments of the present invention. The method begins with a first user (User 1) who may wish to transmit a message to a second user (User 2). User 1 may use the computing device or phone software to create a message. The data may be encrypted and encoded for transmission by, for example, an audio jack. The computing device or phone hardware may generate an audio signal for audio output over a headphone jack or an output port. The device (i.e., goTenna®) hardware may receive and decode the data (e.g., the audio data), prepare the data for broadcast signal, and may transmit the signal. The transmission may repeat until a message receipt is confirmed.

The message from User 1 to User 2 may be transmitted via the unlicensed radio spectrum. The device hardware of User 2 may receive the radio transmission signal and check if a message ID is paired with the computing device of User 2. If the message ID is not paired with the computing device of User 2, then the message may be discarded. If the message ID is paired with the computing device of User 2, then the message may be saved for transmission to User 2's computing device for processing. The device hardware may generate an audio signal via an input jack of User 2's computing device. User 2's computing device may receive the input signal and digitize the signal for the computing device software for further processing. User 2's computing device software may decode the received signal (e.g., an audio signal) and process the decoded signal into a message data stream. The message data stream may be decrypted and displayed to User 2.

Figure 3:
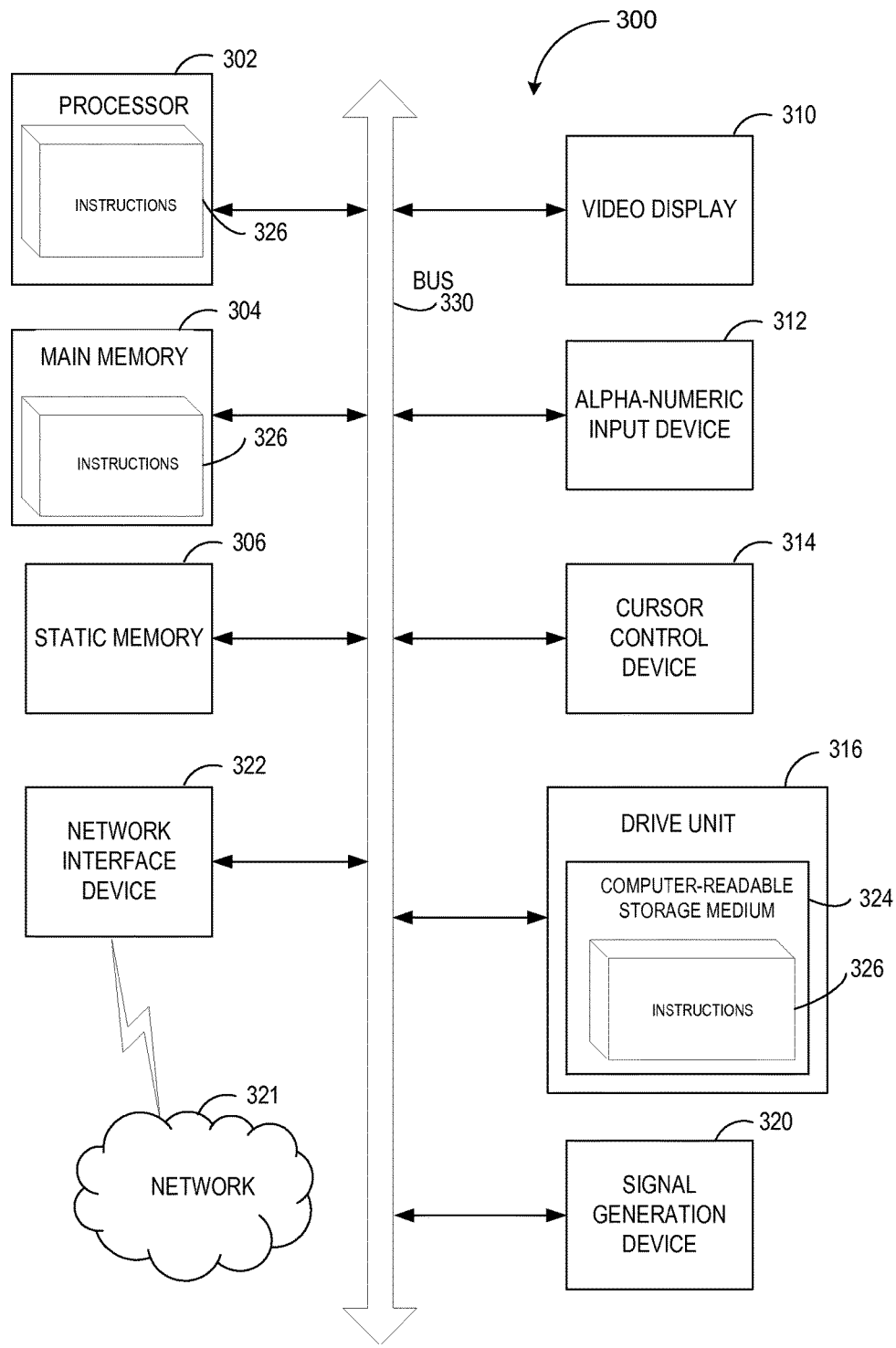
FIG. 3 is a block diagram of an exemplary computer system that may perform one or more of the operations described herein for enabling private and point-to-point communication between computing devices.

FIG. 3 illustrates a diagrammatic representation of a machine in the form of a computer system, in accordance with one example. The computing system may include a set of instructions 326, for causing the machine to perform any one or more of the methodologies discussed herein. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines (e.g., computers) that individually or jointly execute a set (or multiple sets) of instructions to perform any one or more of the methodologies discussed herein.

The computer system 300 includes a processing device 302, a main memory 304 (e.g., read-only memory (ROM), flash memory, dynamic random access memory (DRAM) such as synchronous DRAM (SDRAM), etc.), a static memory 306 (e.g., flash memory, static random access memory (SRAM), etc.), and a secondary memory 316 (e.g., a data storage device), which communicate with each other via a bus 330.

The processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 302 may also be one or more special-purpose processing devices such as an application specific integrated circuit (ASIC), a field programmable gate array (FPGA), a digital signal processor (DSP), network processor, or the like. The processing device 302 is configured to execute the operations for private point-to-point communication between computing devices for performing steps discussed herein.

The computer system 300 may further include a network interface device 322. The network interface device may be in communication with a network 321. The computer system 300 also may include a video display unit 310 (e.g., a liquid crystal display (LCD), a touch screen, or a cathode ray tube (CRT)), an alphanumeric input device 312 (e.g., a keyboard), a cursor control device 314 (e.g., a mouse), and a signal generation device 320 (e.g., a speaker).

The secondary memory 316 may include a computer-readable storage medium (or more specifically a non-transitory computer-readable storage medium) 324 on which is stored one or more sets of instructions 326 (e.g., instructions executed by private point-to-point communication between computing devices) for the computer system 300 representing any one or more of the methodologies or functions described herein. The instructions 326 for the computer system 300 may also reside, completely or at least partially, within the main memory 304 and/or within the processing device 302 during execution thereof by the computer system 300, the main memory 304 and the processing device 302 also constituting computer-readable storage media. The instructions 326 for the computer system 300 may further be transmitted or received over a network via the network interface device 322.

While the computer-readable storage medium 324 is shown in an example to be a single medium, the term "computer-readable storage medium" should be taken to include a single medium or multiple media (e.g., a centralized or distributed database, and/or associated caches and servers) that store the one or more sets of instructions 326. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "as signing," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A communication device, comprising:
   a mesh network radio transceiver, configured to communicate a multipacket series of digital packets directly with other mesh network radio transceivers, using a communication protocol which employs error correction, frequency hopping, over a plurality of different available communication frequencies;
   a short range communication link configured to communicate with a host device; and
   a hardware processor, configured to:
      communicate GPS coordinates between host device and the mesh radio transceiver,
      manage the communication protocol to control error correction, and a selection of the frequency hopping pattern of the mesh network radio transceiver,
      receive the multipacket series of digital packets, comprising an encrypted message, error correction information, a target identifier, and a timestamp,
      assemble contents of the encrypted message,
      transmit a signal confirming receipt of complete assembled contents of the encrypted message, without requiring decryption of the encrypted message;
      send the multipacket series of digital packets comprising the encrypted message, the error correction information, the target identifier, and the timestamp, and
      retransmit digital packets of the multipacket series of digital packets until receipt of a signal confirming receipt of the respective digital packets or a timeout.

2. The communication device according to claim 1, wherein the hardware processor is configured to communicate the GPS coordinates from the host device to the mesh network radio transceiver.

3. The communication device according to claim 1, wherein the hardware processor is configured to communicate the GPS coordinates to the host device from the mesh network radio transceiver.

4. The communication device according to claim 1, wherein the hardware processor is further configured to conduct a public/private key exchange to define an encryption key for the multipacket series of digital packets.

5. The communication device according to claim 1, wherein the hardware processor is further configured to conduct a public/private key exchange to define a decryption key of the received multipacket series of digital packets.

6. The communication device according to claim 1, wherein the hardware processor is further configured to
   transmit, receive, and rebroadcast ping messages through the mesh network radio transceiver; and
   analyze a respective ping message received from another mesh network radio transceiver to determine a position or distance of the communication device from the other mesh network radio transceiver.

7. The communication device according to claim 6, wherein the host device is configured to use the respective ping message to determine and display the position of the other mesh network radio transceiver.

8. The communication device according to claim 6, wherein the host device is configured to use the respective ping message to determine and display the distance to the other mesh network radio transceiver.

9. The communication device according to claim 1, wherein the host device comprises a human speech communication interface.

10. A communication method, comprising:
    communicating a multipacket series of digital packets of a digital message, through a mesh network radio transceiver, directly with other mesh network radio transceivers, using a communication protocol which employs error correction, frequency hopping, and digital data encryption, over a plurality of different available communication frequencies;
    communicating with a host device over a short range communication link;
    communicating GPS coordinates between host device and the mesh network radio transceiver,
    managing the communication protocol to control the error correction of the digital message, and a selection of the frequency hopping pattern of the mesh network radio transceiver;
    receiving the multipacket series of digital packets of the digital message, comprising an encrypted message, error correction information, a target identifier, and a timestamp;
    assembling contents of the encrypted message;
    transmitting a signal confirming receipt of complete assembled contents of the encrypted message, without requiring decryption of the encrypted message;
    sending the multipacket series of digital packets representing the encrypted message, the error correction information, the target identifier, and the timestamp; and
    retransmitting digital packets of the multipacket series of digital packets until receipt of a signal confirming receipt of the respective digital packets or a timeout.

11. The method according to claim 10, said communicating GPS coordinates comprising communicating GPS coordinated from the host device to the mesh network radio transceiver.

12. The method according to claim 10, said communicating GPS coordinates comprising communicating GPS coordinated to the host device from the mesh network radio transceiver.

13. The method according to claim 10, further comprising conducting a public/private key exchange to define an encryption key for the multipacket series of digital packets.

14. The method according to claim 10, further comprising conducting a public/private key exchange to define a decryption key of the received multipacket series of digital packets.

15. The method according to claim 10, further comprising:
  transmitting, receiving, and rebroadcasting ping messages through the mesh network radio transceiver; and
  analyzing a respective ping message received from another mesh network radio transceiver to determine a position or distance of the mesh network radio transceiver from the other mesh network radio transceiver.

16. A non-transitory computer readable medium storing therein instructions for controlling a hardware processor of a communication device, comprising:
  instructions for communicating a multipacket series of digital packets of a digital message, through a mesh network radio transceiver, directly with other mesh network radio transceivers, using a communication protocol which employs error correction, frequency hopping, and digital data encryption, over a plurality of different available communication frequencies;
  instructions for communicating with a host device over a short range communication link;
  instructions for communicating GPS coordinates between host device and the mesh network radio transceiver,
  instructions for managing the communication protocol to control the error correction of the digital message, and a selection of the frequency hopping pattern of the mesh network radio transceiver;
  instructions for receiving the multipacket series of digital packets of the digital message, comprising an encrypted message, error correction information, a target identifier, and a timestamp;
  instructions for assembling contents of the encrypted message;
  instructions for transmitting a signal confirming receipt of complete assembled contents of the encrypted message, without requiring decryption of the encrypted message;
  instructions for sending the multipacket series of digital packets representing the encrypted message, the error correction information, the target identifier, and the timestamp; and
  instructions for retransmitting digital packets of the multipacket series of digital packets until receipt of a signal confirming receipt of the respective digital packets or a timeout.

17. The non-transitory computer readable medium according to claim 16, further comprising instructions for conducting a public/private key exchange to define a cryptographic key for the multipacket series of digital packets.

18. The non-transitory computer readable medium according to claim 16, further comprising instructions for communicating messages between the mesh network radio transceiver and the Internet.

19. The non-transitory computer readable medium according to claim 16, further comprising instructions for determining if the target identifier matches an identifier of the host device.

20. The non-transitory computer readable medium according to claim 16, further comprising: instructions for
  instructions for transmitting, receiving, and rebroadcasting ping messages through the mesh network radio transceiver; and
  instructions for analyzing a respective ping message received from another mesh network radio transceiver to determine a position or distance of the mesh network radio transceiver from the other mesh network radio transceiver.

\* \* \* \* \*